United States Patent [19]

Hotta

[11] Patent Number: 4,951,279

[45] Date of Patent: Aug. 21, 1990

[54] TRANSCEIVER FOR USE IN EARTH STATION IN SATELLITE COMMUNICATIONS SYSTEM

[75] Inventor: Toshinori Hotta, Tokyo, Japan

[73] Assignee: Nec Corporation, Japan

[21] Appl. No.: 259,849

[22] Filed: Oct. 19, 1988

[30] Foreign Application Priority Data

Oct. 20, 1987 [JP] Japan .................. 62-265645

[51] Int. Cl.[5] .......................... H04J 1/12; H04J 1/16
[52] U.S. Cl. ..................... 370/75; 370/69.1; 455/12; 455/32; 455/34; 455/184
[58] Field of Search ............ 370/75, 104, 69.1, ; 375/97; 455/12, 32, 184, 34; 342/352, 358

[56] References Cited

U.S. PATENT DOCUMENTS

| | | | |
|---|---|---|---|
| 4,156,197 | 5/1979 | Merrell | 455/184 |
| 4,291,414 | 9/1981 | Kimura | 455/184 |
| 4,317,225 | 2/1982 | Henderson et al. | 455/184 |
| 4,419,769 | 12/1983 | Cohen | 455/184 |
| 4,607,257 | 8/1986 | Noguchi | 455/12 |
| 4,783,844 | 11/1988 | Higashiyama et al. | 455/34 |
| 4,800,561 | 1/1989 | Ishi | 370/104 |
| 4,850,030 | 7/1989 | Hasimoto et al. | 455/34 |

Primary Examiner—Douglas W. Olms
Assistant Examiner—Min Jung
Attorney, Agent, or Firm—Ostrolenk, Faber, Gerb & Soffen

[57] ABSTRACT

In order to compensate for frequency deviation without using a pilot signal and associated apparatus, a channel number identification code is added to a transmit signal at an earth station transmitter. Each channel unit (e.g. demodulator) of a receiving earth station is arranged to extract a channel identification code from a received signal and to compare this with a preset code assigned to that channel. In the event that the recieved channel idenfication code does not coincide with that of the instant channel, the channel determines that number of channels by which deviation which has occured and adjusts its receiving frequency accordingly.

7 Claims, 4 Drawing Sheets

| CHANNEL NO. | | CHANNEL ID CODE |
|---|---|---|
| DECIMAL | BINARY | |
| ⋮ | ⋮ | ⋮ |
| 5 | 0 0 1 0 1 | 1 0 1 |
| 6 | 0 0 1 1 0 | 1 1 0 |
| 7 | 0 0 1 1 1 | 1 1 1 |
| 8 | 0 1 0 0 0 | 0 0 0 |
| 9 | 0 1 0 0 1 | 0 0 1 |
| 10 | 0 1 0 1 0 | 0 1 0 |
| 11 | 0 1 0 1 1 | 0 1 1 |
| ⋮ | ⋮ | ⋮ |

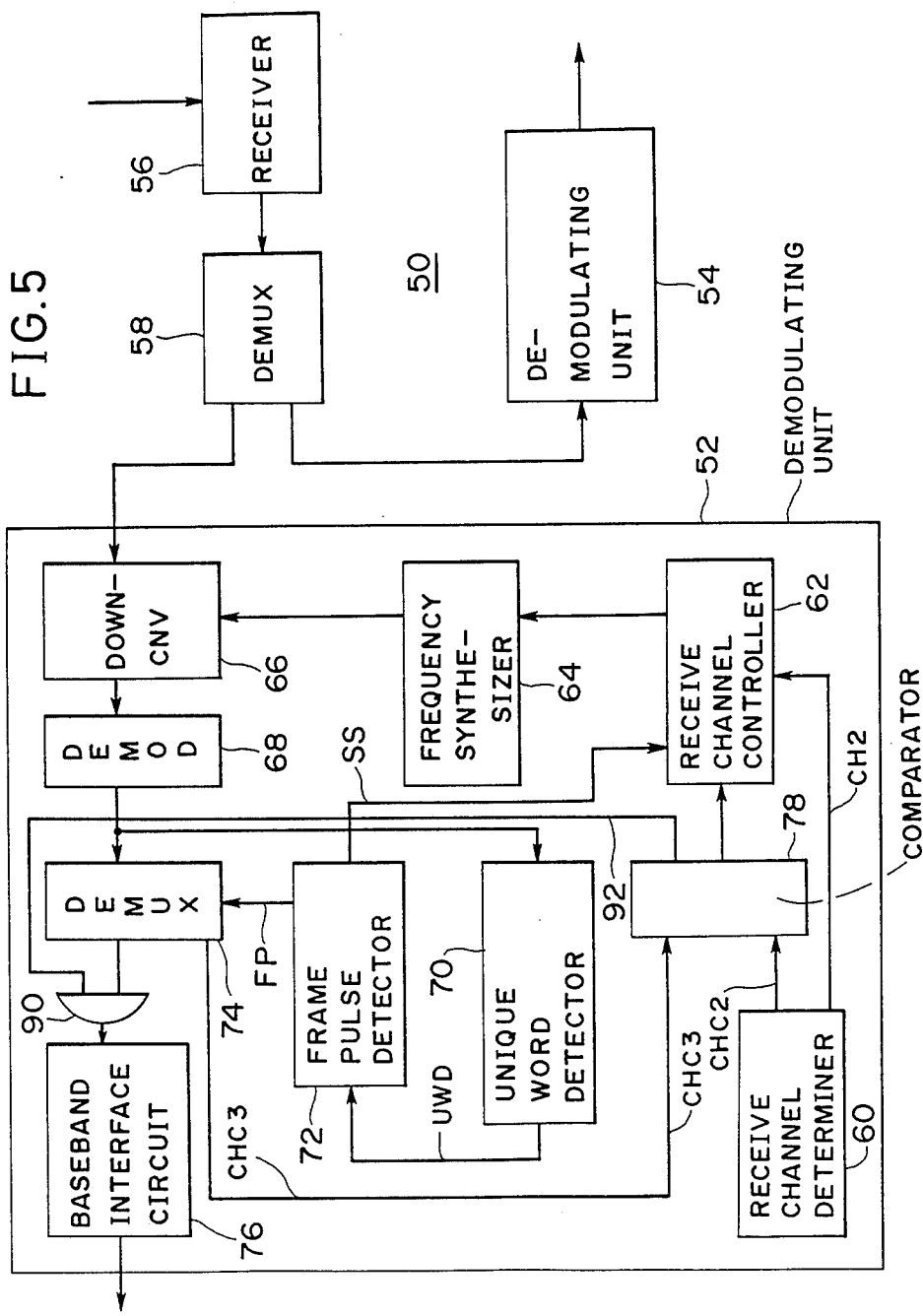

TRANSCEIVER FOR USE IN EARTH STATION IN SATELLITE COMMUNICATIONS SYSTEM

BACKGROUND OF THE INVENTION

1. Field of the Invention

This invention relates generally to a transceiver provided in an earth station of a satellite communications system, and more specifically to such a transceiver suitable for use in a satellite communications system utilizing FDMA (frequency-division multiplexing access).

2. Description of the Prior Art

The FDMA is one of the multiple-access techniques currently used in satellite communications. A frequency-division multiplexing (FDM) is a transmission mode in which a plurality of signals are sent simultaneously using a different carrier frequency for each signal. These carrier frequencies are selected so that the signal spectra do not overlap. It is often the case, in an FDMA communications system, that each of the carrier frequencies received at an earth station deviates from the preset value by about 10 kHz to 100 kHz, for example. The principal cause of this frequency deviation is a frequency drift in a local oscillator which is provided in a frequency converter of a transponder on board a satellite. On the other hand, a frequency drift within an earth station is usually as small as 5 kHz.

Assuming that each satellite communication channel is separated from the adjacent one by 25 kHz and also assuming that the frequency deviation incurred through satellite transmission is between 10 kHz and 100 kHz, then there is a possibility that an earth station fails to receive the channel assigned thereto and erroneously receives either the one immediately adjacent thereto or the one which is separated by one or two channels.

In order to remove such a frequency deviation common to each channel, it is a known practice to utilize a pilot signal which is transmitted from a reference earth station. Each of the other earth stations receives the pilot signal via a satellite and the determines amount of a frequency deviation. Since the correct frequency of the pilot signal is known, each of the earth stations is able to compensate for the departure of each of the carrier frequencies.

However, this prior art technique has encountered the drawback that each of the earth stations has to be equipped with a receiver for exclusively receiving the pilot signal in addition to the usual receiver for normal communications. Thus, the prior earth station transceiver is bulky, complicated and expensive to manufacture.

SUMMARY OF THE INVENTION

It is an object of this invention to provide an earth station transceiver for a satellite communications system, wherein the transceiver is able to compensate for receive signal frequency drifts without a special unit for receiving a pilot signal.

Another object of this invention is to provide a method of compensating for frequency drifts of received signals in a satellite communications system without using a frequency reference such as a pilot signal.

One aspect of this invention takes the form of a transceiver for use in a satellite communications system using FDM technique, which transceiver comprises: first means for adding a channel identification code to each channel, the first means being provided in a transmitting section of the transceiver; second means for detecting an identification code from a received channel signal; third means for comparing the detected identification code with a predetermined preset code indicative of that which should be received; and frequency adjusting means responsive to the difference between the detected code and the predetermined one for, in the event that a difference is detected, controlling channel reception frequency in a manner to receive the appropriate channel.

BRIEF DESCRIPTION OF THE DRAWINGS

The features and advantages of the present invention will become more clearly appreciated from the following description taken in conjunction with the accompanying drawings, in which like elements are denoted by like reference numerals and in which:

FIG. 5 is a block diagram showing another embodiment of a receiving section according to this invention.

DETAILED DESCRIPTION OF THE PREFERRED EMBODIMENTS

Figure 1:
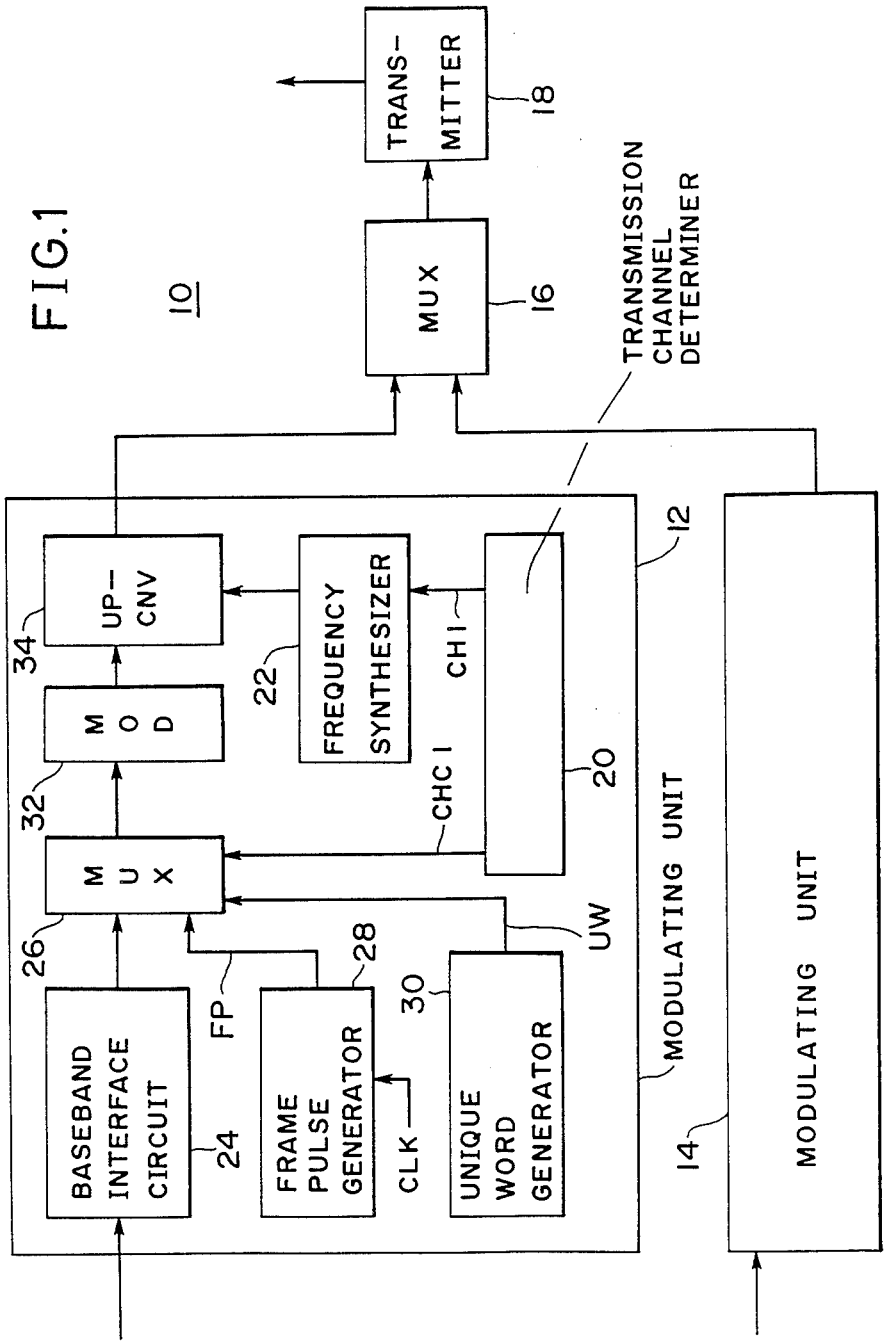
FIG. 1 is a block diagram showing a transmitting section of a transceiver according to this invention.

Reference is now made to FIG. 1, wherein a transmitter section 10 of a transceiver according to this invention is shown in block diagram form.

The transmitter section 10 is provided with two modulating units 12, 14 (viz., two radio channels) only by way of example. The modulating units 12, 14 output modulated IF (Intermediate Frequency) signals which are then combined at a multiplexer or a combiner 16. Each of the combined IF signals undergoes frequency conversion at a transmitter 18, which amplifies the frequency converted and transmits the same.

The modulating units 12, 14 are essentially the same in arrangement. Accordingly, only the construction of unit 12 is described in detail.

Figures 3, 4:
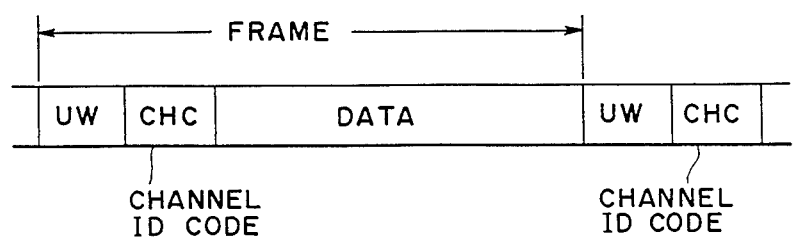
FIG. 3 is a table for describing a channel identification feature of the present invention.
FIG. 4 is a signal format utilized in connection with the present invention.

When initially operating the modulating unit 12, a transmission channel determiner 20 is set to generate a channel number signal or code CH1 and a channel identification signal or code CHC1. The channel number signal CH1 specifies a channel number assigned to the modulating unit 12. A frequency synthesizer 22, in response to the channel signal CH1, outputs a local oscillating signal which corresponds to the signal CH1. The channel identification signal CHC1 specifies the corresponding channel number CH1. The identification signal CHC1 needs not to be the same as the channel signal CH1. More specifically, in the case where (a) a plurality of channels are separated from each other by 25 kHz, (b) each of the channels is allocated to one carrier, (c) the channels are numbered sequentially with respect to frequency and (d) the frequency deviation of each of received signals falls within at most about ±50 kHZ; then it is sufficient to represent the identification signal CHC1 by the last three digits of the channel number signal CH1. Therefore, if the channel number code CH1 assigned to the modulating unit 12 is "00011" (binary), the channel identification code CHC1 assumes "011" (binary) instead of "00011"FIG. 3 is a table showing an example of the relationship between a channel number (CH) and a corresponding channel identification code (CHC).

A base band interface 24 converts a base band input data, applied thereto from a terminal unit (not shown), into a signal with a predetermined format, which is then applied to a multiplexer 26. A transmission frame pulse generator 28 counts clock pulses inputted thereto and outputs a train of frame pulses FP each of which is generated upon counting up a preset number. The frame pulse FP is applied to the multiplexer 26. On the other hand, a unique word generator 30 supplies the multiplexer 26 with a unique word (UW). The above-mentioned channel identification code CHC1 is applied to the multiplexer 26. The multiplexer 26 receives the outputs of the blocks 20, 24, 28 and 30, and generates a signal whose format is schematically shown in FIG. 4.

A modulator 32 generates a signal with a predetermined central frequency which is modulated by the output of the multiplexer 26. An up-converter 34 converts the frequency of the output of the modulator 32 using the local oscillating signal from the frequency synthesizer 22, and then generates the output thereof as a transmission IF signal. As mentioned above, the multiplexer or combiner 16 is supplied with the outputs (IF signals) from the modulating units 12, 14, and applies its output (viz.,combined signal) to the transmitter 18.

Figure 2:
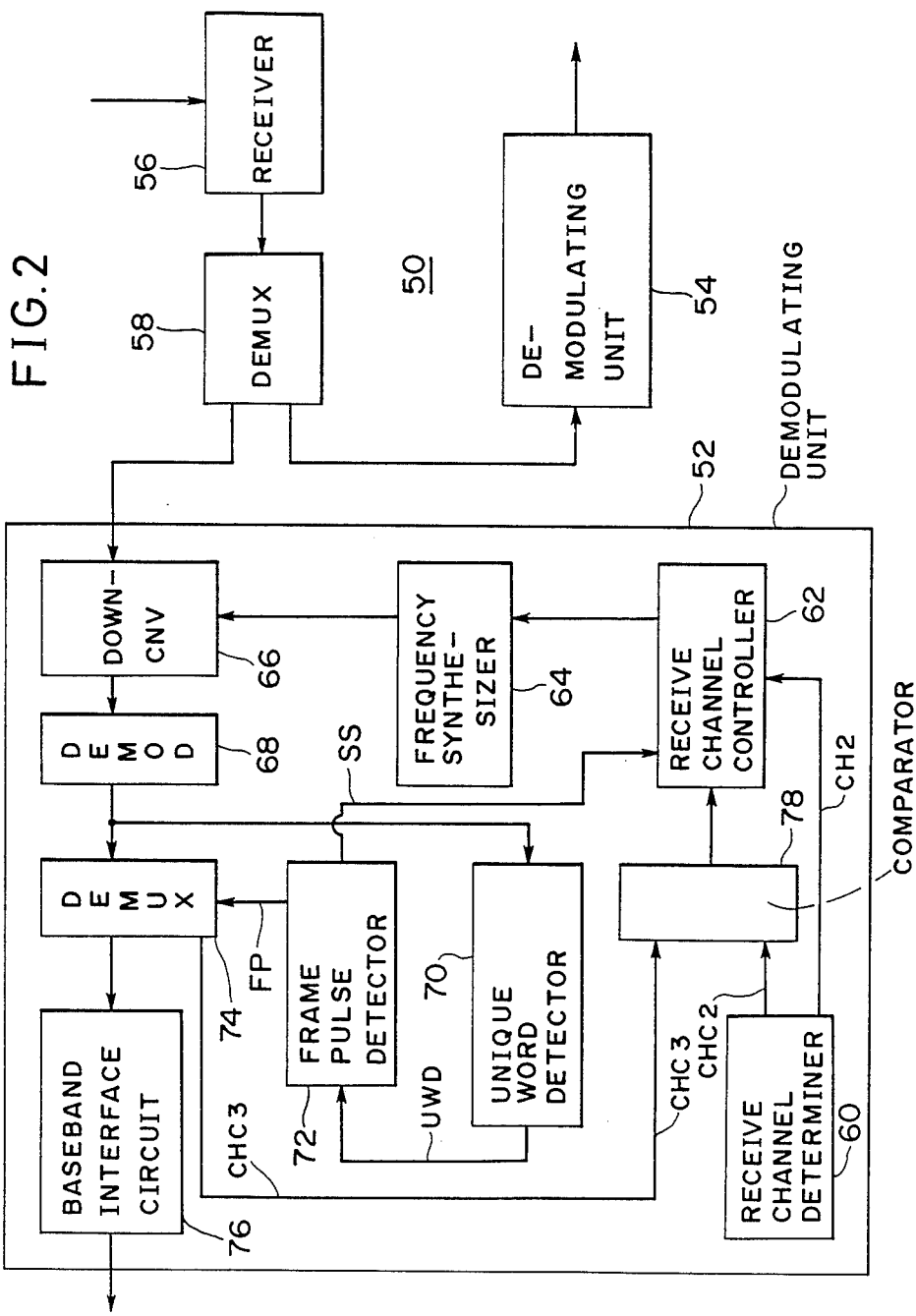
FIG. 2 is a block diagram showing a receiving section of the transceiver according to this invention.

Turning now to FIG. 2, there is shown which shows in block diagram form a receiving section 50 forming part of the transceiver according to this invention. The receiving section 50 includes two demodulating units 52, 54 (only by way of example), a receiver 56 and a demultiplexer or a distributor 58.

The demodulating units 52, 54 are essentially the same, so that only the construction of unit 52 is referred to in detail.

For convenience of description, it is assumed that the demodulating unit 52 has been assigned to demodulate a channel 2 data but is in fact erroneously supplied with a channel 3 data due to a frequency drift incurred at a satellite transponder. The channels 2, 3 are indicated by channel codes CH2, CH3, respectively.

A receive channel determiner 60 is initialized to generate two codes: one is the channel code CH2 and the other a channel identification code CHC2 which specifies the code CH2. When the demodulating unit 52 is initially operated, a receive channel controller 62 relays or passes the channel code CH2 to a frequency synthesizer 64. Consequently, the frequency synthesizer 64 generates a local oscillating signal according to the channel code CH2. A down-converter 66 is supplied with the local oscillating signal, and, frequency converts an IF signal applied from the demultiplexer 58 using the local oscillating signal applied. A demodulator 68 synchronously detects the output of the down-converter 66. A unique word detector 70, coupled to the demodulator 68, produces a unique word detection signal UWD upon detection of a unique word UW. On the other hand, a frame pulse detector 72, responsive to the signal UWD, generates a frame pulse FP and a sync state signal SS. A demultiplexer 74 extracts the channel identification code CHC3 from the output of the demodulator 68 using the frame pulse FP, while the demultiplex 74 applies a transmitted data to a baseband interface circuit 76.

As shown in FIG. 2, the channel identification code CHC3 extracted from the demultiplexer 74 is applied to a comparator 78 to which the above-mentioned channel identification code CHC2 is also applied from the determiner 60. The controller 62 receives the output of the comparator 78, and controls, only while the sync state signal SS indicates the synchronous state of the unit 52, the frequency synthesizer 64 in a manner to shift the receive channel number toward one in this particular case. When the frequency (or channel) correction is performed, the signal SS indicates asynchronism for a predetermined time period (T1). However, upon the signal SS indicating asynchronism, the receive channel controller 62 starts to hold the output of the comparator 78 during a protection time period (T2) longer than T1. Accordingly, when the time duration T1 expires, the signal SS restores its sync state indication. At this time, the demodulator 52 has already demodulated the correct channel signal (viz., the channel 2 signal). In the case where the comparator 78 receives the channel identification code CHC2 from the demultiplexer 74, then the comparator 78 outputs a signal indicative of coincidence or zero. In such a case, the receive channel controller 62 passes the channel code CH2 from the channel determiner 60 to the frequency synthesizer 64.

When the demodulating unit 52 enters a stable state and thereafter the transmission terminates, the sync state signal SS indicates asnychronism. When the protection time duration T2 expires, the receive channel controller 62 returns to its initial state whereby the output of the receive channel determiner 60 is relayed to the synthesizer 64.

Further, in the case where the demodulating unit 52 goes out of synchronism due to an instantaneous disturbance, if unit 52 restores synchronism before the protection time period T2 lapses, correct signal reception is able to be carried out.

FIG. 5 illustrates further embodiment of a receiving section according to this invention. The FIG. 5 arrangement is essentially the same as the FIG. 2 arrangement and differs in that an AND gate 90 is further provided between the blocks 74 and 76. The AND gate 90 has one input coupled to the demultiplexer 74 and the other input coupled to the comparator 78. In this case, the comparator 78 has to be modified to generate a gate control output on a line 92 such that (a) the gate control output assumes a logic "1" if the two inputs of the comparator 78 coincides with each other and (b) otherwise, the gate control output assumes a logic "0". As an alternative, the AND gate may be positioned after the baseband interface circuit 76. Further, the abovementioned gate control signal may be derived from the receive channel controller 62. According to the abovementioned further embodiment, an undesired channel signal is not allowed to be outputted from the demodulator.

The foregoing description shows only preferred embodiments of the present invention. Various modifications are apparent to those skilled in the art without departing from the scope of this invention which is only limited by the appended claims.

What is claimed is:

1. A transceiver for use in a satellite communications system using frequency-division multiplexing, which transceiver comprises at least one transmitting arrangement and at least one receiving arrangement;

said at least one transmitting arrangement including a modulating section in which a first channel identification is added to a frame of data to be transmitted through a transmitting channel assigned to said at least one transmitting arrangement; and said at least one receiving arrangement including a demodulating section, said demodulating section including:
  (i) first means for detecting a second channel-identification added to a frame of data received;
  (ii) second means for comparing said second channel-identification with a third channel-identification, said third channel-identification identification indicative of a receiving channel assigned to said at least one receiving arrangement; and
  (iii) third means responsive to the difference between said second and third channel-identifications for, in the event that a difference is detected, adjusting channel reception frequency in a manner to receive a channel signal through said receiving channel assigned to said at least one receiving arrangement.

2. A transceiver as claimed in claim 1, wherein said at least one receiving arrangement further comprises an AND gate for permitting said data received by said at least one receiving arrangement to be outputted from said modulating section only when said second means indicates a difference between said second and third channel-identifications is absent.

3. In a method of transceiving data using frequency-division multiplexing, wherein channel identification is added to each frame of data to be transmitted through each of channels, the improvement in combination with the foregoing comprising the steps of:
  (a) receiving a channel signal;
  (b) demodulating data from said channel signal received in step (a);
  (c) detecting channel identification in the frame of the data obtained in step (b);
  (d) comparing the channel identification detected in step (c) with channel identification indicating a channel through which data should be received; and
  (e) adjusting a demodulating frequency with respect to the result obtained in step (d) for, in the event that a difference is detected, controlling channel reception frequency in a manner to receive data that should be received.

4. A method as claimed in claim 3, further comprising the step of permitting the data demodulated in step (b) to be outputted only when the difference obtained in step (d) is zero.

5. A method as claimed in claim 3, wherein the channels used for transmitting and receiving data are assigned consecutive numbers and wherein each channel identification is part of the number of the corresponding channel.

6. An apparatus for transceiving data using frequency-division multiplexing, wherein channel identification is added to each frame of data to be transmitted through each channel, comprising:
  first means for receiving a channel signal;
  second means for demodulating data from said channel signal received by said first means;
  third means for detecting channel identification in the frame of the data obtained in said second means;
  fourth means for comparing the channel identification detected in said third means with channel identification indicating a channel through which data should be received; and
  fifth means for adjusting a demodulating frequency with respect to the result obtained in said fourth means for, in the event that a difference is detected, controlling channel reception frequency in a manner to receive the data which should be received.

7. An apparatus as claimed in claim 6, further comprising means for permitting the data derived in said second means to be outputted only when the difference detected in said fourth means is zero.

* * * * *